(12) United States Patent
Chang

(10) Patent No.: US 7,537,420 B2
(45) Date of Patent: May 26, 2009

(54) WORKING MACHINE THAT CAN CLAMP A WORKPIECE AUTOMATICALLY

(76) Inventor: Pin-Feng Chang, 36, Alley 45, Lane 884, Sanfeng Rd., Fengyuan City, Taichung County (TW)

( * ) Notice: Subject to any disclaimer, the term of this patent is extended or adjusted under 35 U.S.C. 154(b) by 357 days.

(21) Appl. No.: 11/504,801

(22) Filed: Aug. 15, 2006

(65) Prior Publication Data
US 2007/0122244 A1 May 31, 2007

(30) Foreign Application Priority Data
Nov. 28, 2005 (TW) .............................. 94220610 U

(51) Int. Cl.
*B23B 47/18* (2006.01)
(52) U.S. Cl. ....................... 408/103; 408/136
(58) Field of Classification Search ................ 408/103, 408/136, 108, 109, 129, 234; 144/286.5, 144/286.1, 278.1; *B23B 47/18*
See application file for complete search history.

(56) References Cited
U.S. PATENT DOCUMENTS

| | | | | |
|---|---|---|---|---|
| 1,559,263 A | * | 10/1925 | Lacey ............................. 408/3 |
| 1,755,401 A | * | 4/1930 | Koehl et al. .................... 408/51 |
| 2,420,759 A | * | 5/1947 | Stelz ............................. 408/89 |
| 2,512,753 A | * | 6/1950 | Topham ......................... 408/98 |
| 2,567,191 A | * | 9/1951 | de Anguera ................. 227/116 |
| 2,824,470 A | * | 2/1958 | Monroe ........................ 408/103 |
| 3,534,639 A | * | 10/1970 | Treichler ..................... 408/112 |
| 3,890,058 A | * | 6/1975 | Self et al. .................... 408/112 |
| 4,057,358 A | * | 11/1977 | Young .......................... 408/91 |
| 4,419,031 A | * | 12/1983 | Palma ......................... 408/1 R |
| 7,140,813 B2 | * | 11/2006 | Tucker ......................... 408/43 |
| 2005/0013673 A1 | * | 1/2005 | Tucker ......................... 408/53 |

* cited by examiner

*Primary Examiner*—Daniel W Howell
(74) *Attorney, Agent, or Firm*—Alan Kamrath; Kamrath & Associates PA

(57) ABSTRACT

A working machine includes a base for placing a workpiece, a working mechanism movable relative to a first face of the workpiece, a clamping unit movable relative to a second face of the workpiece, a linkage connected to the working mechanism and the clamping unit to drive the working mechanism and the clamping unit to move relative to the workpiece simultaneously, and a drive unit connected to the linkage. Thus, the working machine is operated by a user's one foot, so that the working machine is operated easily and conveniently. In addition, the workpiece is clamped automatically without having to hold the workpiece by a user's one hand, thereby protecting the user's safety.

11 Claims, 7 Drawing Sheets

WORKING MACHINE THAT CAN CLAMP A WORKPIECE AUTOMATICALLY

BACKGROUND OF THE INVENTION

1. Field of the Invention

The present invention relates to a working machine, and, more particularly, to a working machine, such as a drilling machine for working a workpiece, such as a wood material.

2. Description of the Related Art

A conventional working machine 1 in accordance with the prior art shown in FIG. 7 is used for working a workpiece (not shown), such as a wood material and comprises a work table 11 for placing the workpiece, a limit unit 12 movably mounted on the work table 11 to retain the workpiece, a working mechanism 13 movably mounted on the work table 11 and movable relative to the workpiece, and a drive unit 14 mounted on the work table 11 to drive the working mechanism 13 to move relative to the work table 11 and the workpiece. The working mechanism 13 includes a working tool 131, such as a drill tip, and a motor 132 for driving the working tool 131. In operation, the working mechanism 13 is driven by the drive unit 14 to move relative to the work table 11 and the workpiece, so that the working tool 131 of the working mechanism 13 is rotated and sunk into the workpiece to drill a hole in the workpiece.

However, the user has to hold the workpiece by his one hand and to operate the drive unit 14 by his other hand, thereby causing inconvenience to the user. In addition, the user has to hold the workpiece by his one hand so that the working tool 131 of the working mechanism 13 easily hurts the user's one hand, thereby causing danger to the user.

BRIEF SUMMARY OF THE INVENTION

In accordance with the present invention, there is provided a working machine, comprising a base having a top face provided with a work table for placing a workpiece, a working mechanism mounted on the base and movable relative to a first face of the workpiece, a clamping unit mounted on the base and movable relative to a second face of the workpiece, a linkage mounted on the base and connected to the working mechanism and the clamping unit to drive the working mechanism and the clamping unit to move relative to the workpiece simultaneously, and a drive unit mounted on the base and connected to the linkage to drive the linkage.

The primary objective of the present invention is to provide a working machine that can clamp a workpiece automatically.

Another objective of the present invention is to provide a working machine, wherein the working machine is operated by a user's one foot so as to perform a drill working process on the workpiece, so that the working machine is operated easily and conveniently, thereby greatly facilitating the user operating the working machine, and thereby saving manual work.

A further objective of the present invention is to provide a working machine, wherein the workpiece is clamped automatically without having to hold the workpiece by a user's one hand, thereby protecting the user's safety during the working process.

A further objective of the present invention is to provide a working machine, wherein the workpiece is clamped and the working process is performed simultaneously, so that the working machine is operated rapidly, thereby greatly saving the working time.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
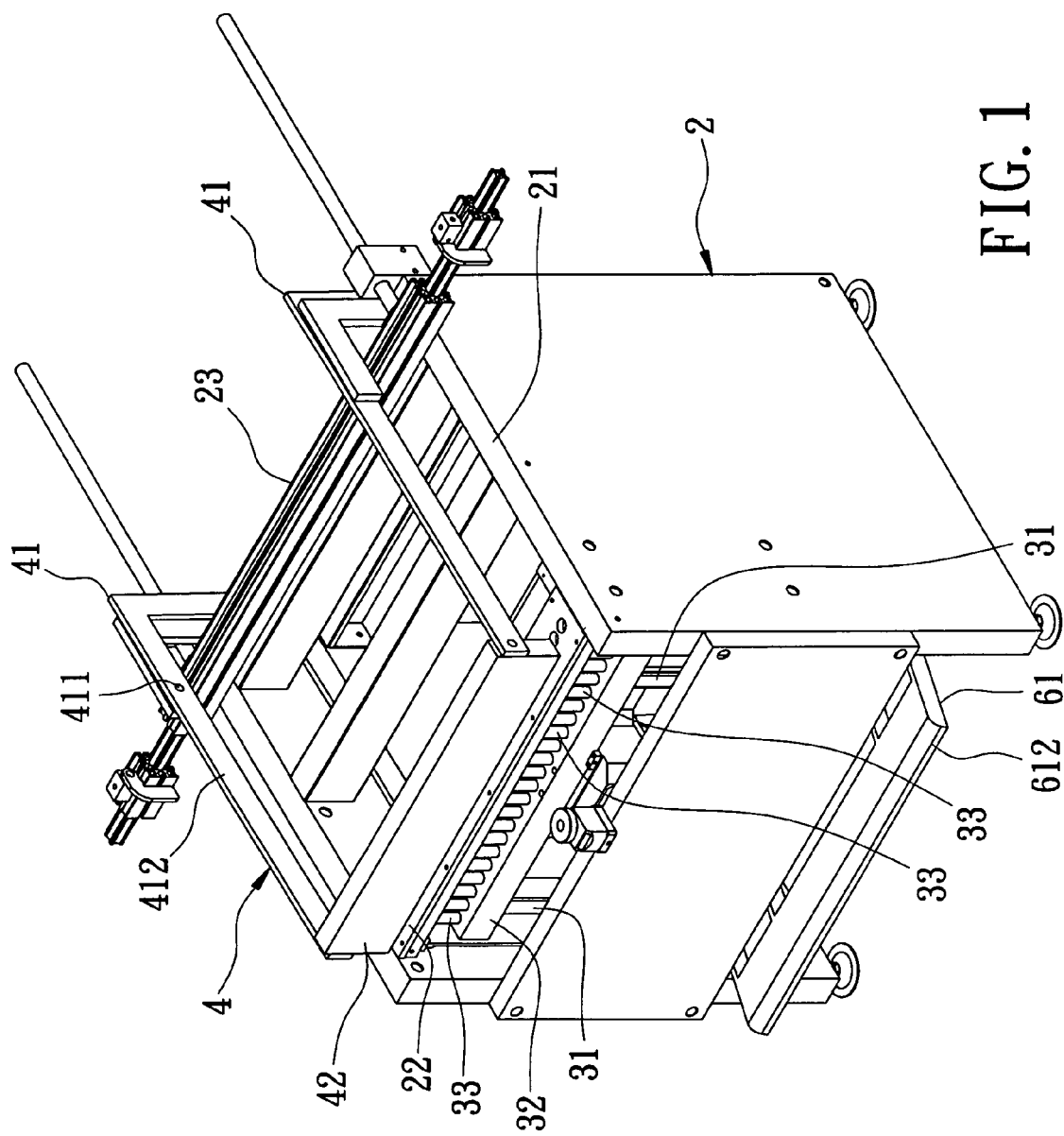
FIG. 1 is a perspective view of a working machine in accordance with the preferred embodiment of the present invention.
Figure 2:
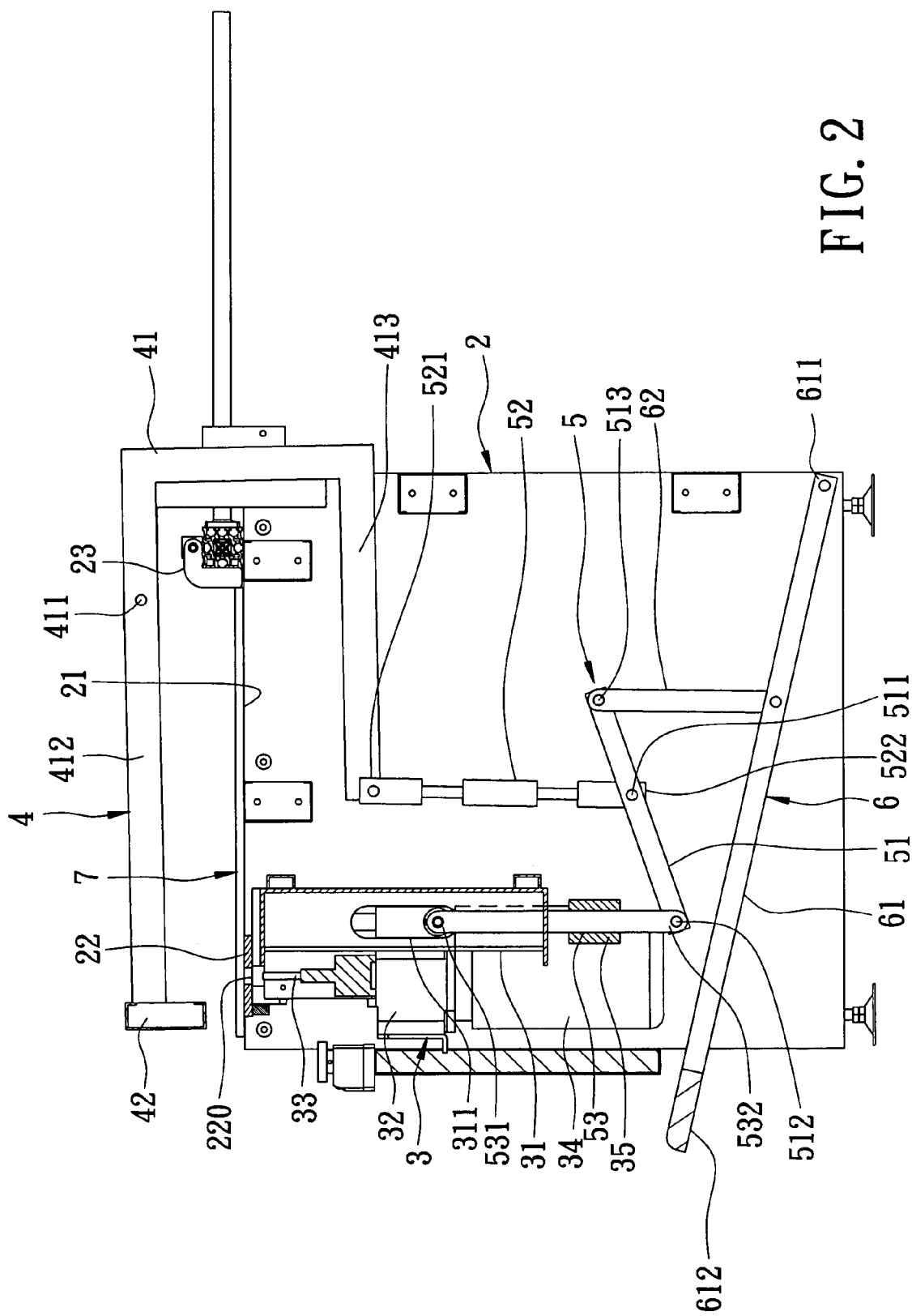
FIG. 2 is a plan cross-sectional view of the working machine as shown in FIG. 1.

Referring to the drawings and initially to FIGS. 1 and 2, a working machine in accordance with the preferred embodiment of the present invention comprises a base 2, a working mechanism 3, a clamping unit 4, a linkage 5, and a drive unit 6.

The base 3 has a top face 21 provided with a work table 22 for placing a workpiece 7, such as a wood material, and a limit unit 23 is movably mounted on the top face 21 of the base 2 and movable relative to the work table 22.

The working mechanism 3 is mounted on the base 2 and includes two tracks 31 secured in the base 2 and extended in a perpendicular direction, a slide 32 movably mounted on the tracks 31, at least one working tool 33 mounted on the slide 32 to move therewith and located opposite to the work table 22, at least one motor 34 mounted on the slide 32 to drive the working tool 33, and a counterweight 35 secured on the slide 32. Each of the tracks 31 has an axially extending elongated slot 311. The counterweight 35 has a determined weight, so that the slide 32 is moved downward by the weight of the counterweight 35 to drive the working tool 33 and the motor 34 to move downward to the position of a lowermost dead point by guidance of the elongated slot 311 of each of the tracks 31.

The clamping unit 4 is mounted on the base 2 and includes two substantially U-shaped clamping bars 41 each pivotally mounted on the base 2 and each having a first side formed with a press portion 412 located above the work table 22 of the base 2 and a second side formed with a drive portion 413 extended into the base 2 and directed toward a straight direction the same as that of the press portion 412, and a clamping block 42 mounted between the press portions 412 of the clamping bars 41 and located opposite to the work table 22. The press portion 412 of each of the clamping bars 41 is pivotally mounted on the base 2 by a pivot shaft 411.

The linkage 5 is mounted on the base 2 and includes two first links 52 each having a first end 521 pivotally mounted on the drive portion 413 of the respective clamping bar 41 of the clamping unit 4, two second links 51 each having a mediate portion 511 pivotally mounted on a second end 522 of the respective first link 52, and two third links 53 each having a first end 532 pivotally mounted on a first end 512 of the respective second link 51 and a second end 531 pivotally mounted on the slide 32 through the elongated slot 311 of the respective track 31.

The drive unit 6 is mounted on the base 2 and connected to the second links 51 of the linkage 5 to drive the second links 51 to displace in a perpendicular direction. The drive unit 6 includes a pedal 61 having a first end 611 pivotally mounted on the base 2 and a second end 612 protruding outwardly from the base 2, and two connecting levers 62 each having a first end pivotally mounted on a mediate portion of the pedal 61 and a second end pivotally mounted on a second end 513 of the respective second link 51.

In operation, referring to FIGS. 1-4, the workpiece 7 is initially placed on the work table 22 of the base 2 and retained by the limit unit 23. When the second end 612 of the pedal 61 is stepped by a user's one foot, the pedal 61 is pivoted downward about the first end 611 of the pedal 61 to move downward the connecting levers 62 which move downward the second links 51 which move downward the first links 52 and the third links 53 simultaneously, so that the drive portions 413 of the clamping bars 41 are driven downward by the first links 52 and the slide 32 is driven downward by the third links 53 simultaneously.

At this time, the slide 32 is moved to and located at the position of the lowermost dead point by guidance of the elongated slot 311 of each of the tracks 31, so that the slide 32 is fixed and the third links 53 cannot drive and move the slide 32 downward any more. Thus, the first end 532 of each of the third links 53 and the first end 512 of each of the second links 51 are fixed by the slide 32, so that each of the second links 51 is pivoted downward about the first end 512 thereof, and the first links 52 are moved downward by the second links 51 to move the drive portions 413 of the clamping bars 41 downward.

Figure 3:
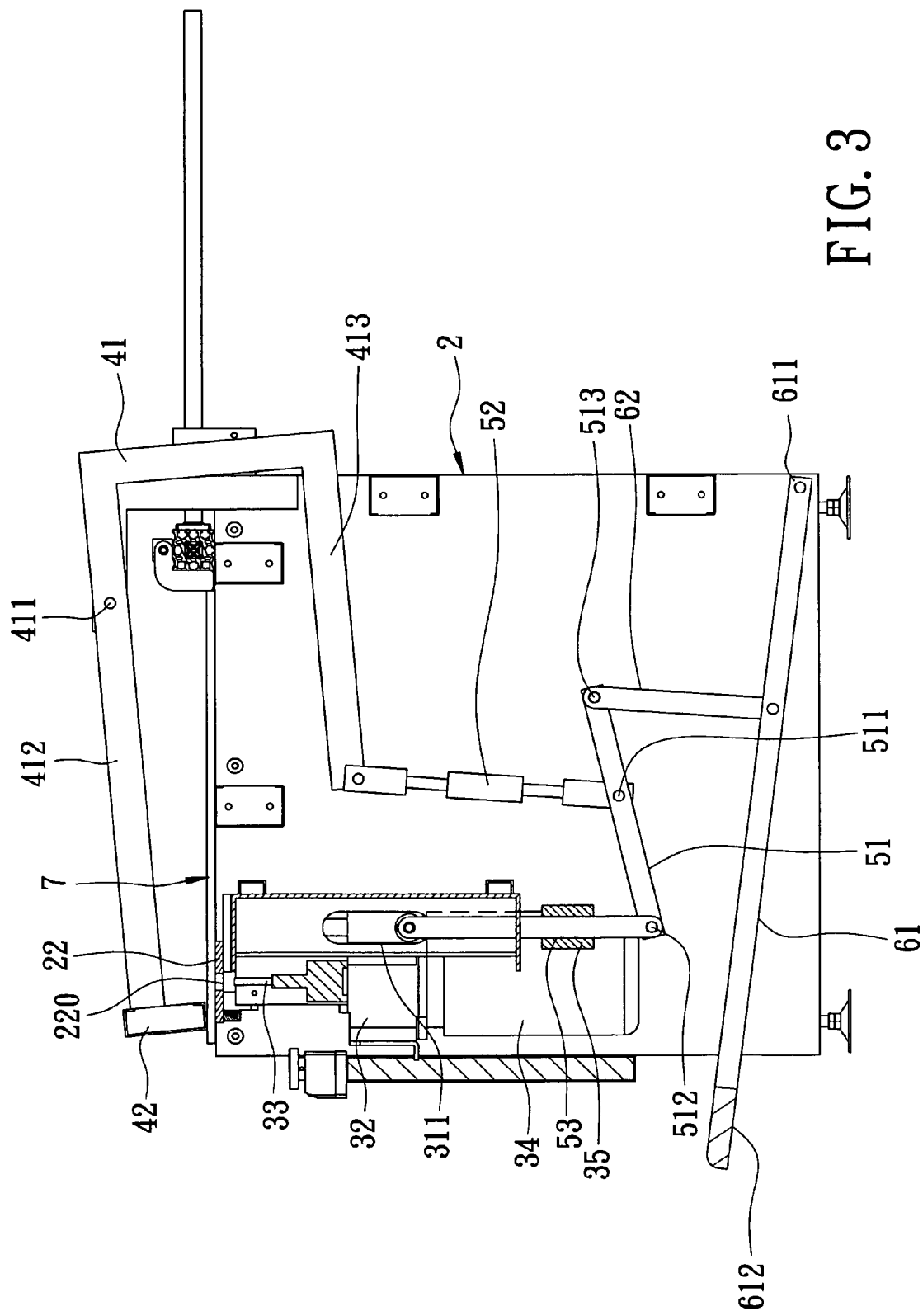
FIG. 3 is a schematic operational view of the working machine as shown in FIG. 2.

When the drive portions 413 of the clamping bars 41 are moved downward by the first links 52, each of the clamping bars 41 is pivoted downward about the pivot shaft 411, so that the press portions 412 of the clamping bars 41 are moved downward to move the clamping block 42 downward until the clamping block 42 rests on and presses the workpiece 7 on the work table 22 of the base 2 as shown in FIG. 3. Thus, the workpiece 7 is clamped closely by the clamping block 42.

Figure 4:
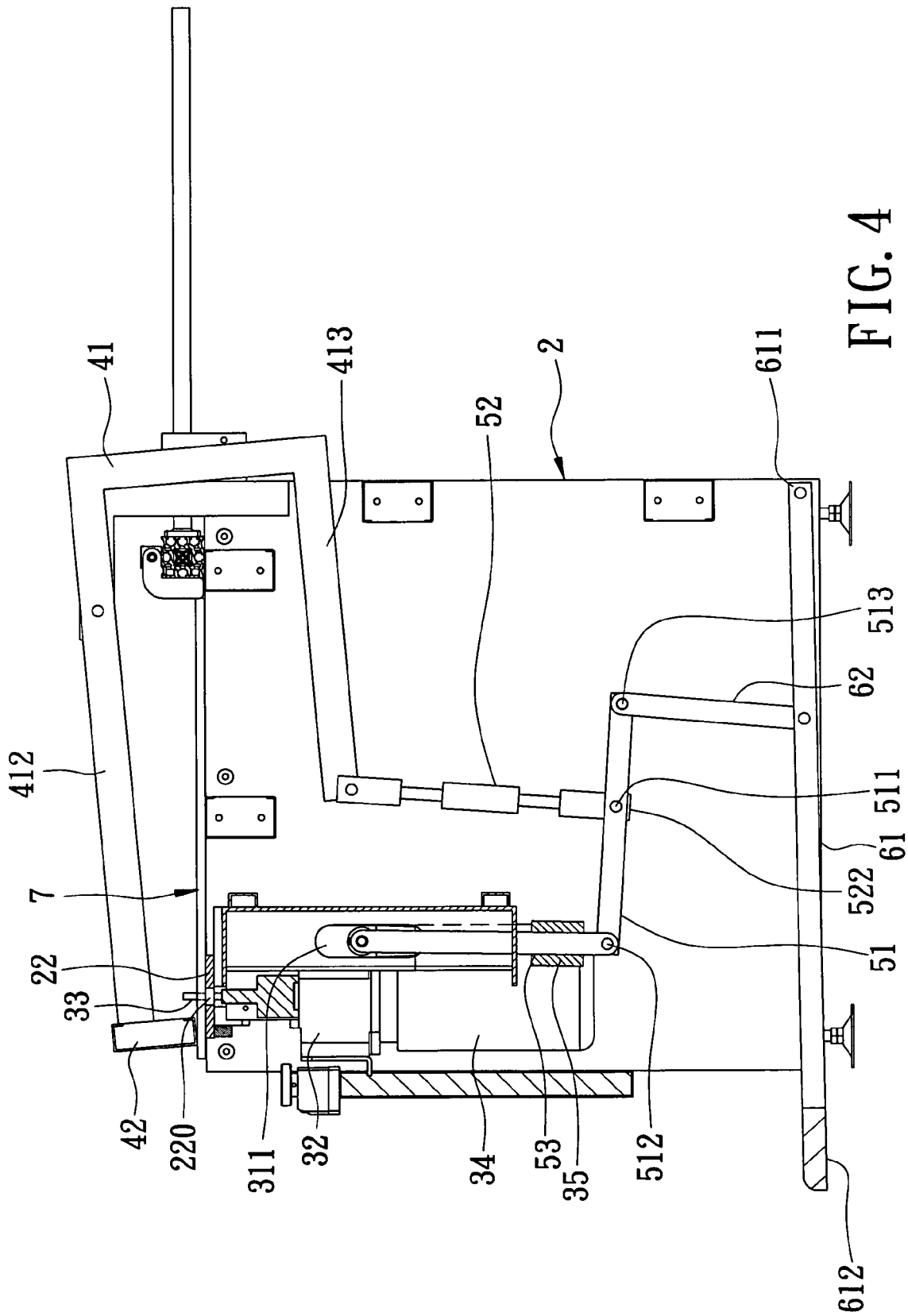
FIG. 4 is a schematic operational view of the working machine as shown in FIG. 3.

After the clamping block 42 rests on the workpiece 7, movement of the clamping bars 41 is stopped, so that the clamping bars 41 is fixed to fix the first links 52. Thus, the second end 522 of each of the first links 52 is fixed to function as a fulcrum, and the mediate portion 511 of each of the second links 51 is also fixed to function as a fulcrum. At this time, the second ends 513 of the second links 51 are moved downward by the connecting levers 62 successively, so that each of the second links 51 is pivoted about the mediate portion 511 thereof, and the first end 512 of each of the second links 51 is moved upward by a lever rule as shown in FIG. 4 to push upward the third links 53 which push the slide 32 to move upward by guidance of the elongated slot 311 of each of the tracks 31. Thus, the working tool 33 is pushed upward by the slide 32 to extend through a through hole 220 formed in the work table 22 and to drill the workpiece 7 so as to perform a drill working process on the workpiece 7.

After the drill working process is accomplished, the force applied on the pedal 61 is removed. Thus, the slide 32 is moved downward by the weight of the counterweight 35 to drive the working tool 33 and the motor 34 to move downward to the position of the lowermost dead point again by guidance of the elongated slot 311 of each of the tracks 31, while the linkage 5 and the drive unit 6 are also returned to the original state as shown in FIG. 2.

Figure 5:
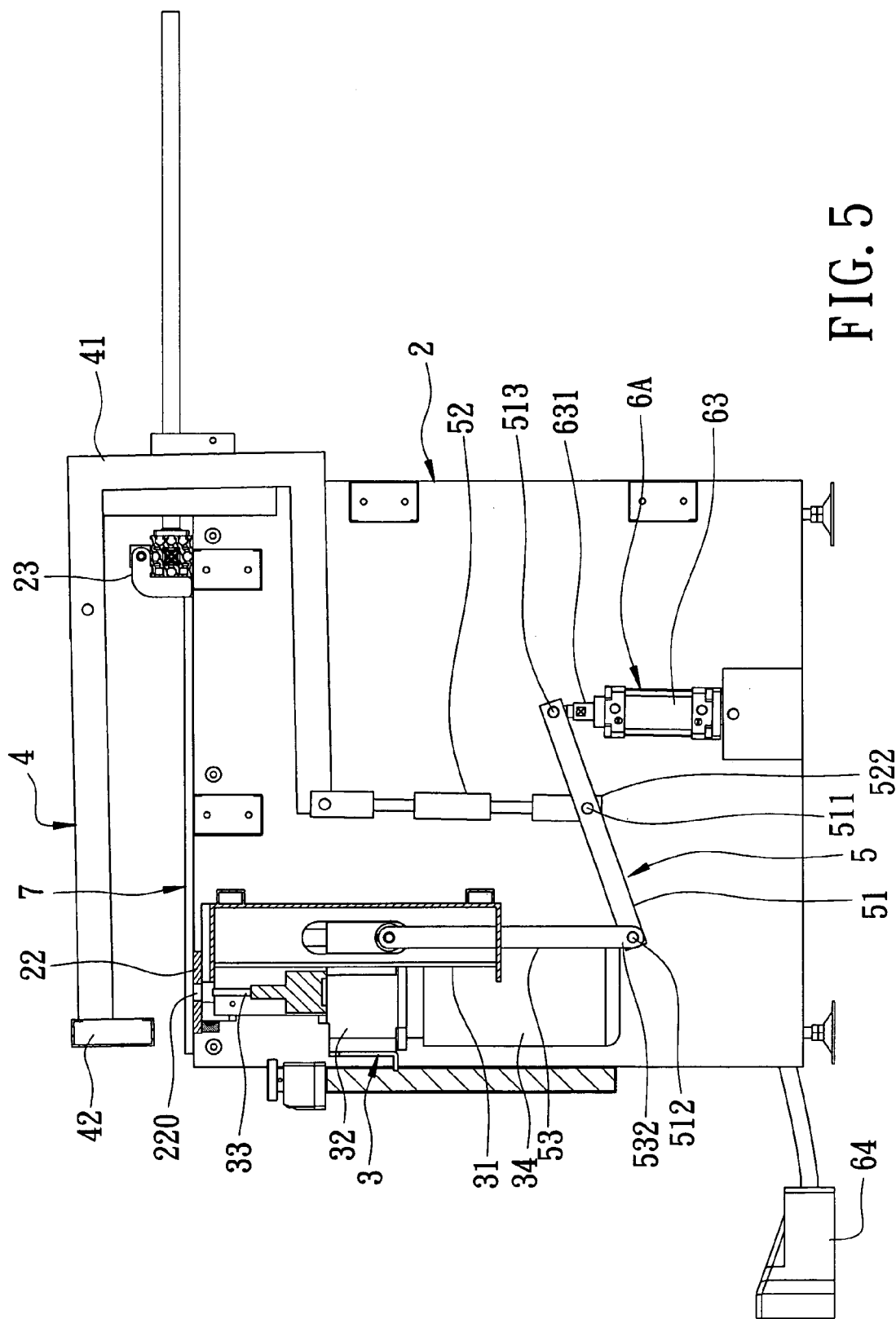
FIG. 5 is a plan cross-sectional view of a working machine in accordance with another preferred embodiment of the present invention.
Figure 6:
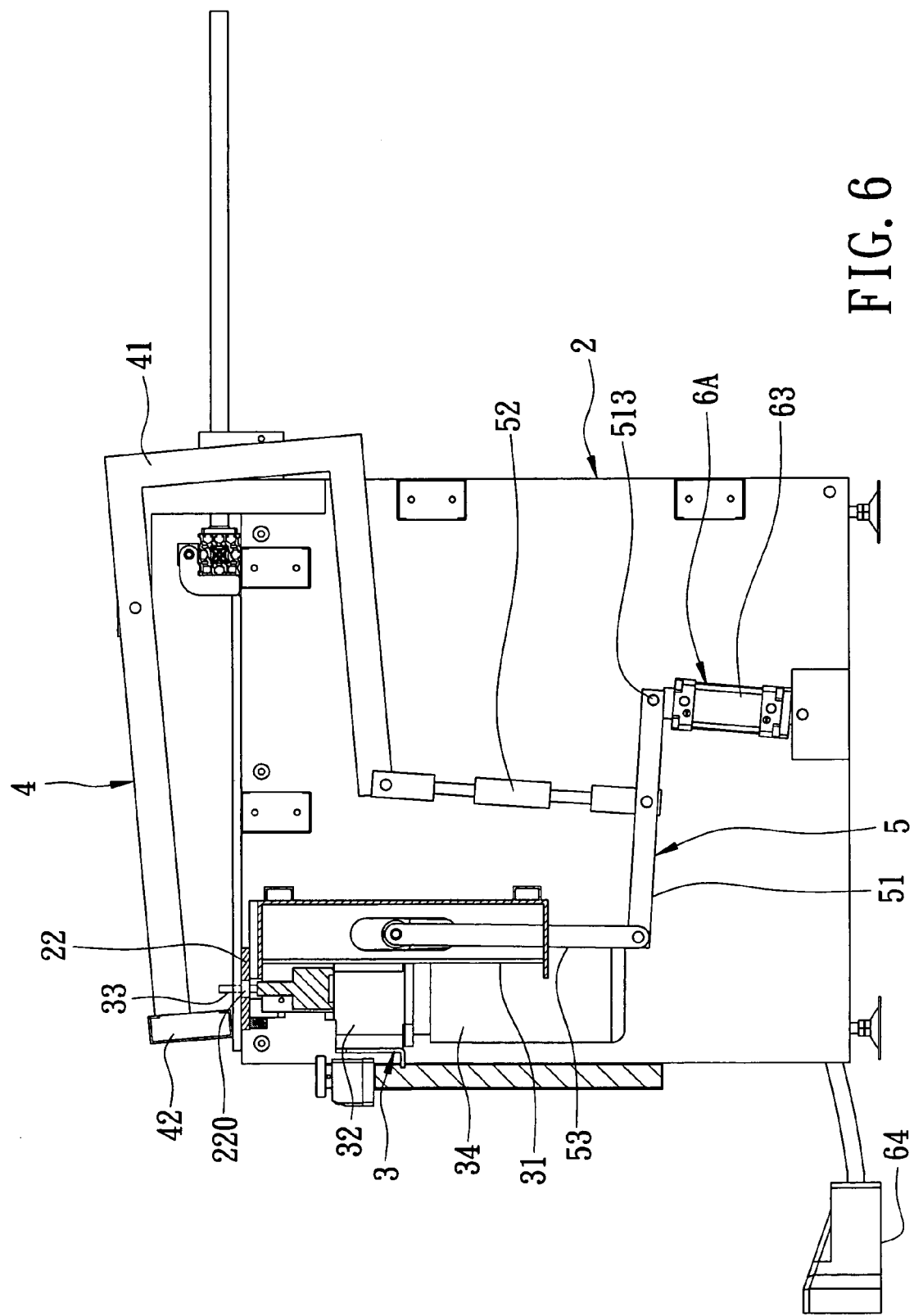
FIG. 6 is a schematic operational view of the working machine as shown in FIG. 5.
Figure 7:
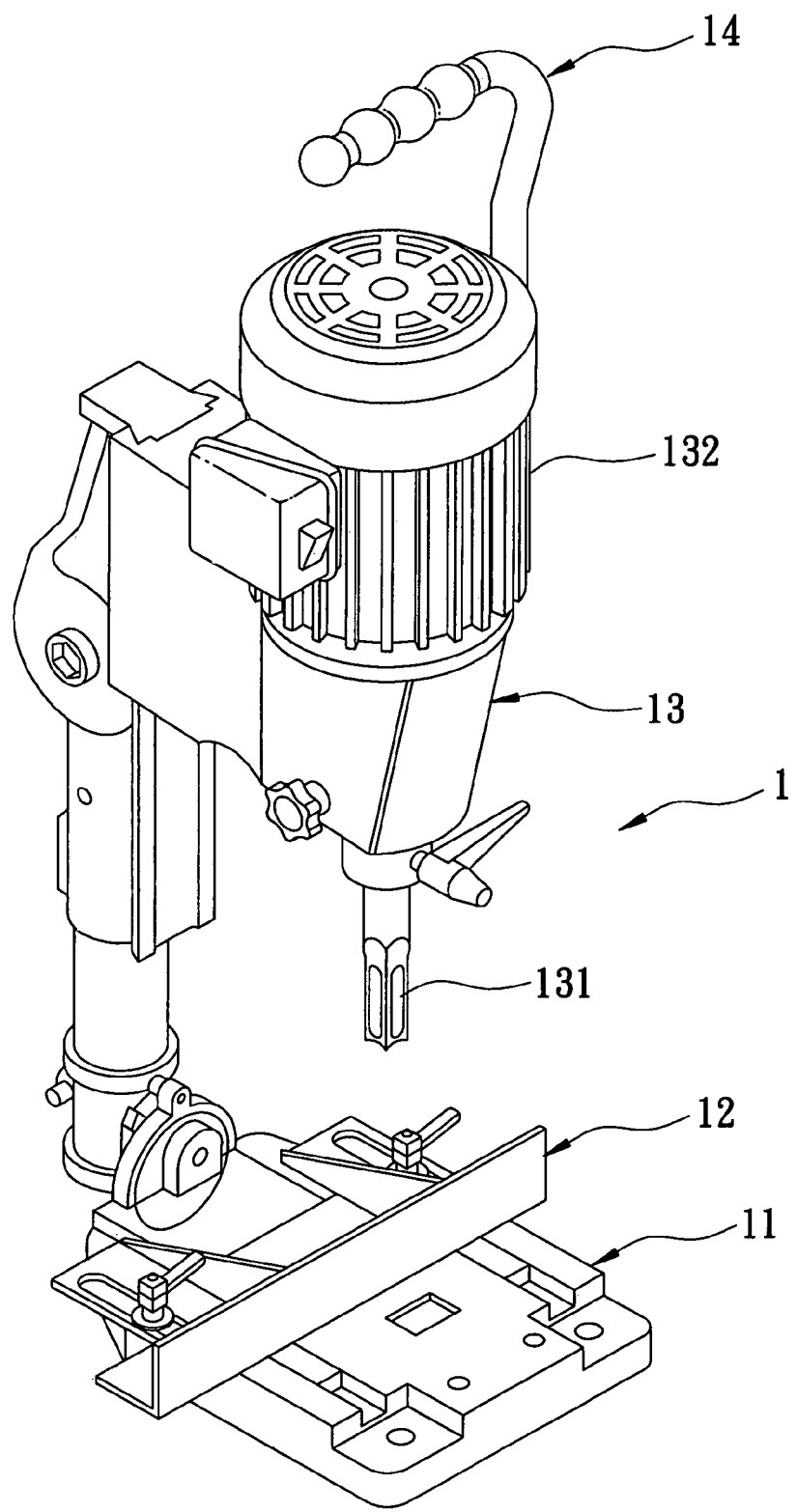
FIG. 7 is a perspective view of a conventional working machine in accordance with the prior art.

Referring to FIGS. 5 and 6, the counterweight 35 is undefined, and the drive unit 6A includes a cylinder 63 mounted in the base 2, a piston lever 631 movably mounted in the cylinder 63 and having a distal end pivotally mounted on a second end 513 of the respective second link 51, and a control switch 64 protruded outwardly from the base 2 and connected to the cylinder 63 to control operation of the piston lever 631. The piston lever 631 of the drive unit 6A is extended in a perpendicular direction. Thus, when the control switch 64 is stepped by a user's one foot, the control switch 64 is started to drive the piston lever 631 to move the linkage 5, so that the linkage 5 is operated to drive the clamping unit 4 to press and clamp the workpiece 7 closely and to drive the working mechanism 3 to move relative to the workpiece 7 so as to perform a drill working process on the workpiece 7.

Accordingly, the working machine is operated by a user's one foot so as to perform a drill working process on the workpiece 7, so that the working machine is operated easily and conveniently, thereby greatly facilitating the user operating the working machine, and thereby saving manual work. In addition, the workpiece 7 is clamped automatically without having to hold the workpiece 7 by a user's one hand, thereby protecting the user's safety during the working process. Further, the workpiece 7 is clamped and the working process is performed simultaneously, so that the working machine is operated rapidly, thereby greatly saving the working time.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A working machine, comprising:
a base having a top face provided with a work table for placing a workpiece;
a working mechanism mounted on the base and movable relative to a first face of the workpiece;
a clamping unit mounted on the base and movable relative to a second face of the workpiece;
a linkage mounted on the base and connected to the working mechanism and the clamping unit to drive the working mechanism and the clamping unit to move relative to the workpiece simultaneously;
a drive unit mounted on the base and connected to the linkage to drive the linkage;
wherein the working mechanism includes two tracks secured in the base, a slide movably mounted on the tracks, and at least one working tool mounted on the slide to move therewith and located opposite to the work table;
each of the tracks has an axially extending elongated slot;
the clamping unit includes two clamping bars, each pivotally mounted on the base and each having a first side formed with a press portion located above the work table of the base and a second side formed with a drive portion extended into the base and directed toward a straight direction the same as that of the press portion, and a clamping block mounted between the press portions of the clamping bars and located opposite to the work table;
the linkage includes two first links each having a first end pivotally mounted on the drive portion of the respective clamping bar of the clamping unit, two second links each having a mediate portion pivotally mounted on a second end of the respective first link, and two third links each having a first end pivotally mounted on a first end of the respective second link and a second end pivotally mounted on the slide through the elongated slot of the respective track.

2. The working machine in accordance with claim 1, wherein the working mechanism further includes at least one motor mounted on the slide to drive the working tool.

3. The working machine in accordance with claim 1, wherein the working mechanism further includes a counterweight secured on the slide.

4. The working machine in accordance with claim 3, wherein the slide is movable downward by a weight of the counterweight to drive the working tool to move downward to a position of a lowermost dead point by guidance of the elongated slot of each of the tracks.

5. The working machine in accordance with claim 1, wherein each of the clamping bars is substantially U-shaped.

6. The working machine in accordance with claim 1, wherein the press portion of each of the clamping bars is pivotally mounted on the base by a pivot shaft.

7. The working machine in accordance with claim 1, wherein the drive unit is connected to the second links of the linkage to drive the second links to displace.

8. The working machine in accordance with claim 7, wherein the drive unit includes a pedal having a first end pivotally mounted on the base and a second end protruding outwardly from the base, and two connecting levers each having a first end pivotally mounted on a mediate portion of the pedal and a second end pivotally mounted on a second end of the respective second link.

9. The working machine in accordance with claim 7, wherein the drive unit includes a cylinder mounted in the base, a piston lever movably mounted in the cylinder and having a distal end pivotally mounted on a second end of the respective second link, and a control switch protruded outwardly from the base and connected to the cylinder to control operation of the piston lever.

10. The working machine in accordance with claim 9, wherein when the control switch is stepped by a user's one foot, the control switch is started to drive the piston lever to move the linkage, so that the linkage is operated to drive the clamping unit to press and clamp the workpiece and to drive the working mechanism to move relative to the workpiece.

11. The working machine in accordance with claim 8, wherein when the second end of the pedal is stepped by a user's one foot, the pedal is pivoted downward about the first end of the pedal to move downward the connecting levers which move downward the second links which move downward the first links and the third links simultaneously, so that the drive portions of the clamping bars are driven downward by the first links and the slide is driven downward by the third links simultaneously.

* * * * *